(12) United States Patent
Carlson et al.

(10) Patent No.: US 9,340,934 B2
(45) Date of Patent: May 17, 2016

(54) PAVEMENT MARKING MATERIALS AND METHODS

(75) Inventors: Eugen H. Carlson, Apple Valley, MN (US); Alexander J. Kugel, Woodbury, MN (US); Matthew D. Wilding, White Bear Lake, MN (US); Pamela A. Percha, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 59 days.

(21) Appl. No.: 14/234,230

(22) PCT Filed: Aug. 30, 2012

(86) PCT No.: PCT/US2012/052995
§ 371 (c)(1),
(2), (4) Date: Jan. 22, 2014

(87) PCT Pub. No.: WO2013/033302
PCT Pub. Date: Mar. 7, 2013

(65) Prior Publication Data
US 2014/0193576 A1 Jul. 10, 2014

Related U.S. Application Data

(60) Provisional application No. 61/530,143, filed on Sep. 1, 2011.

(51) Int. Cl.
*E01F 9/04* (2006.01)
*C09D 123/08* (2006.01)

(52) U.S. Cl.
CPC .......... *E01F 9/041* (2013.01); *C09D 123/0869* (2013.01); *E01F 9/042* (2013.01)

(58) Field of Classification Search
CPC ........................... C09D 123/0869; E01F 9/041
USPC ........................................... 427/137; 523/172
See application file for complete search history.

(56) References Cited

U.S. PATENT DOCUMENTS

| | | | |
|---|---|---|---|
| 3,043,196 A | 7/1962 | Palmquist et al. | |
| 3,171,827 A | 3/1965 | de Vries et al. | |
| 3,279,336 A | 10/1966 | Eden et al. | |
| 3,393,615 A | 7/1968 | Micheln | |
| 3,556,637 A | 1/1971 | Palmquist et al. | |
| 3,874,801 A | 4/1975 | White | |
| 3,902,666 A | 9/1975 | Ito et al. | |
| 4,117,192 A | 9/1978 | Jorgensen | |
| 4,248,932 A | 2/1981 | Tung et al. | |
| 4,388,359 A | 6/1983 | Ethen et al. | |
| 4,490,432 A | 12/1984 | Jordan | |
| 4,564,556 A | 1/1986 | Lange | |
| 4,681,401 A | 7/1987 | Wyckoff | |
| 4,758,469 A | 7/1988 | Lange | |
| 4,937,127 A * | 6/1990 | Haenggi et al. | 428/148 |
| 4,969,713 A | 11/1990 | Wyckoff | |
| 4,988,555 A | 1/1991 | Hedblom | |
| 5,087,148 A | 2/1992 | Wyckoff | |
| 5,108,218 A | 4/1992 | Wyckoff | |
| 5,139,590 A | 8/1992 | Wyckoff | |
| 5,194,113 A | 3/1993 | Lasch et al. | |
| 5,536,569 A | 7/1996 | Lasch et al. | |
| 5,557,461 A | 9/1996 | Wyckoff | |
| 5,563,569 A | 10/1996 | Pellegrino et al. | |
| 5,643,655 A | 7/1997 | Passarino | |
| 5,942,280 A | 8/1999 | Mathers et al. | |
| 6,008,302 A | 12/1999 | Olson et al. | |
| 6,217,252 B1 | 4/2001 | Tolliver et al. | |
| 6,245,700 B1 | 6/2001 | Budd et al. | |
| 6,511,739 B2 | 1/2003 | Kasai et al. | |
| 7,169,831 B2 | 1/2007 | Helland et al. | |
| 7,513,941 B2 | 4/2009 | Frey | |
| 7,524,779 B2 | 4/2009 | Frey | |
| 2003/0069358 A1 | 4/2003 | Helland et al. | |
| 2003/0099512 A1 | 5/2003 | Helland et al. | |
| 2007/0092635 A1 | 4/2007 | Huh et al. | |

FOREIGN PATENT DOCUMENTS

WO WO 97-03814 2/1997

OTHER PUBLICATIONS

Dow Product Selection Guide (2009).*
PCT International Search Report from PCT/US2012/052995 mailed on Nov. 30, 2012 3 pages.

* cited by examiner

*Primary Examiner* — Edward Cain
(74) *Attorney, Agent, or Firm* — Trisha D. Adamson

(57) ABSTRACT

The thermoplastic pavements markers and pavement marking compositions of the present application include a miscible blend of ethylene acrylic acid polymers and have a crystallization onset temperature observed upon cooling of greater than 65.6° C. (150° F.).

28 Claims, No Drawings

PAVEMENT MARKING MATERIALS AND METHODS

TECHNICAL FIELD

The present patent application generally relates to pavement marking materials and compositions and to methods of making and applying them.

BACKGROUND

Pavement markings (e.g., paints, tapes, and individually mounted articles) guide and direct motorists and pedestrians traveling along roadways and paths. Paint was a preferred pavement marking for many years. However, modern pavement marking materials offer significant advantages over paint, such as increased visibility, retroreflectance, improved durability, and temporary and/or removable marking options.

Examples of modern pavement marking materials include, for example, thermoplastic pavement marking sheet materials, tapes, compositions, and raised pavement markers. Some thermoplastic pavement markings include high molecular weight ethylene acrylic acid polymers (see, for example, U.S. Pat. No. 6,217,252 (Tolliver)).

SUMMARY

The currently available thermoplastic pavement marking compositions including high molecular weight ethylene acrylic acid polymers (EAAs) have a melting temperature range that is within the working temperature range of the roadway surface on which the pavement marker is associated. Consequently, the currently available thermoplastic pavement marking compositions including EAAs can be substantially non-crystalline while on the roadway surface. When the weather is hot, these softer pavement markings may further soften, resulting in a tackier pavement marking. Tackier pavement markings generally exhibit increased dirt pickup and degradation (e.g., material loss).

Pavement markings are subject to continuous wear and exposure to the elements as well as road chemicals. Consequently, there is a need for pavement marking compositions and pavement markers that provide durability and retained reflectivity once applied to a surface and dried and/or hardened. The inventors of the present patent application discovered a thermoplastic pavement marking composition that exhibits increased crystalline content, crystallization onset temperature on cooling, and crystalline melt temperatures. Such pavement marking compositions can exhibit improved physical properties. Some exemplary improved physical properties include, for example, dimensional stability, resistance to flow, dirt resistance, hardness, durability, and resistance to deformation. Additionally, pavement marking compositions with increased crystallization onset temperatures can exhibit improved application processing because they set faster than currently available pavement marking compositions.

The inventors of the present patent application discovered pavement markings, pavement marking materials and compositions, and methods of making and applying pavement markings that exhibit at least one of improved physical properties, improved whiteness, enhanced durability, retained reflectivity, and increased dirt resistance. The compositions and materials of the present application can be used to form a marked transportation surface.

One embodiment of the present application is a thermoplastic pavement marking composition, comprising: a miscible blend of ethylene acrylic acid polymers including a first ethylene acrylic acid polymer having a number average molecular weight between about $1.0 \times 10^4$ grams per mole and about $1.0 \times 10^5$ grams per mole; and a second ethylene acrylic acid polymer having a number average molecular weight between about 1500 grams per mole and about 5000 grams per mole; wherein the crystallization onset temperature observed upon cooling of the thermoplastic pavement marking composition is greater than 65.6° C. (150° F.).

Some implementations of this embodiment include white ceramic microspheres. Some implementations of this embodiment include up to about 85 wt % white ceramic microspheres. Some implementations of this embodiment include between about 1.5 wt % and about 55 wt % weight percent first ethylene acrylic acid polymer, wherein the weight percent is of the entire thermoplastic pavement marking composition. Some implementations of this embodiment include between about 5 wt % and about 72 wt % second ethylene acrylic acid polymer, wherein the weight percent is of the entire thermoplastic pavement marking composition. Some implementations of this embodiment include between about 0.1 wt % to about 10 weight percent $TiO_2$, wherein the weight percent is of the entire thermoplastic pavement marking composition. Some implementations of this embodiment further include optical components. In some implementations of this embodiment, the first ethylene acrylic acid polymer has an acid content between about 3% and about 20%. In some implementations of this embodiment, the second ethylene acrylic acid polymer has an acid content between about 5 and about 15%. Some implementations of this embodiment further include acrylic polymers and copolymers, olefin polymers and copolymers, olefin block copolymers, thermoplastic urethane polymers and copolymers, ester polymers and copolymers, polyamide polymers and copolymers, and blends thereof. Some implementations of this embodiment have a flow according to AASHTO T-250-5 of less than 28 percent residue. Some implementations of this embodiment have a temperature at which 1% weight loss occurs as measured by thermogravimetric analysis of greater than 230° C. Some implementations of this embodiment have a whiteness index as measured by ASTM E313 of greater than 60 after 4 hours of heating at 425° F.

Another embodiment of the present application is a thermoplastic pavement marking composition, comprising: a miscible blend of ethylene acrylic acid polymers including a first ethylene acrylic acid polymer having an acid content between about 3% and about 20% and a second ethylene acrylic acid polymer having an acid content between about 5% and about 15%; wherein the crystallization onset temperature observed upon cooling of the thermoplastic pavement marking composition is greater than 65.6° C. (150° F.).

Some implementations of this embodiment include white ceramic microspheres. Some implementations of this embodiment include up to about 85 wt % white ceramic microspheres. Some implementations of this embodiment include between about 1.5 wt % and about 55 wt % weight percent first ethylene acrylic acid polymer, wherein the weight percent is of the entire thermoplastic pavement marking composition. Some implementations of this embodiment include between about 5 wt % and about 72 wt % second ethylene acrylic acid polymer, wherein the weight percent is of the entire thermoplastic pavement marking composition. Some implementations of this embodiment include between about 0.1 wt % to about 10 weight percent $TiO_2$, wherein the weight percent is of the entire thermoplastic pavement marking composition. Some implementations of this embodiment further include optical components. In some implementations of this embodiment, the first ethylene acrylic acid polymer has an acid content between about 3% and about 20%. In some implementations of this embodiment, the second ethylene acrylic acid polymer has an acid content between about 5 and about 15%. Some implementations of this embodiment further include acrylic polymers and copolymers, olefin polymers and copolymers, olefin block copolymers, thermoplastic urethane polymers and copolymers, ester polymers and copolymers, polyamide polymers and copolymers, and blends thereof. Some implementations of this embodiment have a flow according to AASHTO T-250-5 of less than 28 percent residue. Some implementations of this embodiment have a temperature at which 1% weight loss occurs as measured by thermogravimetric analysis of greater than 230° C. Some implementations of this embodiment have a whiteness index as measured by ASTM E313 of greater than 60 after 4 hours of heating at 425 degrees F.

Another embodiment of the present application is a method of forming a pavement marking, comprising heating the thermoplastic pavement marking of any of the preceding claims; and applying the resulting homogenous mixture to a roadway. In some implementations of this embodiment, the method further includes applying optical components to the roadway.

DETAILED DESCRIPTION

The thermoplastic pavements markers and pavement marking compositions of the present application include a miscible blend of ethylene acrylic acid polymers and have a crystallization onset temperature observed upon cooling of greater than 65.5° C. (150° F.). Miscibility of two polymeric materials is unexpected, and this unexpected result directly relates to the crystallization observed upon cooling, which directly relates to at least some of the advantages of the pavement markers and pavement marking compositions of the present patent application. As used herein, the term "miscibility" or "miscible" refers to a blend of polymers having a single crystallization peak. The term "thermoplastic" is used to mean a polymeric or wax material that has the property of softening or melting and becoming pliable when heated and of hardening and becoming rigid again when cooled.

In one embodiment, the pavement marking composition includes a first ethylene acrylic acid polymer having a number average molecular weight between about $1.0 \times 10^4$ g/mol and about $1.0 \times 10^5$ g/mol and a second ethylene acrylic acid polymer having a number average molecular weight between about 1500 g/mol and about 5000 g/mol. Molecular weight is one of many properties directly related to viscosity of a polymer.

In another embodiment, the pavement marking composition includes a first ethylene acrylic acid polymer having an acid content between about 3 wt % and about 20 wt % and a second ethylene acrylic acid polymer having an acid content between about 5 wt % and about 15 wt %. Acid content affects bonding between the pavement marking composition and the roadway as well as interaction between the pavement marking composition and the substrate. Acid content may improve the stability of the pavement marking composition. Additionally, increased acid content may result in increased viscosity of the pavement marking composition.

In some embodiments, the pavement marking composition includes between about 1.5 wt % and about 55 wt % first ethylene acrylic acid polymer where the weight percent is of the entire thermoplastic pavement marking composition. In some embodiments, the pavement marking composition includes between about 5 wt % and about 72 wt % second ethylene acrylic acid polymer where the weight percent is of the entire thermoplastic pavement marking composition.

The EAA polymers used in the embodiments described above can be blended with other polymeric materials to impart improved properties such as durability, toughness, dirt resistance and adhesion. Some exemplary polymers that EAA can be blended with include, for example, acrylic polymers and copolymers, olefin polymers and copolymers, olefin block copolymers, thermoplastic urethane polymers and copolymers, ester polymers and copolymers, polyamide polymers and copolymers, and blends thereof.

Some exemplary acrylic polymers and copolymers include, for example, those that contain repeating units derivable from acrylic acid or methacrylic acid, and include polymers of monomers such as methyl methacrylate, ethyl methacrylate, n-butyl acrylate, n-butyl methacrylate, ethyl hexyl acrylate, hydroxyethyl acrylate, hydroxyethyl methacrylate, acrylic acid, methacrylic acid, styrene, methyl styrene and glycidyl acrylate. Commercially available versions of such acrylic polymers and copolymers include, for example, JONCRYL SCX-815, -817 and -819 carboxylfunctional acrylic resins (commercially available from SC Johnson Polymer), ELVACITE grades 2008, 2013, 2016, 2028, and 2043 methacrylate resins (commercially available from ICI Acrylics), and ACRYLOID B-66 methyl/butyl methacrylate polymer (commercially available from Rohm & Haas).

Some exemplary olefin polymers and copolymers include, for example, non-grease, non-wax materials containing repeating units derivable from olefinic monomers, and include ethylene acrylic acid copolymers, ethylene methacrylic acid copolymers (including ionically-crosslinkable ethylene methacrylic acid copolymers), polyethylene plastics, polypropylene, ethylenepropylene-diene terpolymers, polybutylene, ethylene n-butyl acrylate, ethylene maleic anhydride copolymers, ethylene vinyl acetate, and ethylene methyl acrylate and ethylene ethyl acrylate copolymers). Commercially available versions of such olefin polymers and copolymers include, for example, NUCREL ethylene methacrylic acid copolymers, SURLYN ionically-crosslinkable ethylene methacrylic acid copolymer and ELVALOY AM ethylene/glycidyl/acrylate terpolymers (all commercially available from E. I. duPont de Nemours), and A-C 573A ethylene-maleic anhydride copolymer (commercially available from Honeywell International Inc.), Infuse olefin block copolymer (commercially available from The Dow Chemical Co.).

Some exemplary urethane polymers and copolymers include, for example, those containing repeating urethane linkages and aromatic or aliphatic groups or segments. Where weatherability is desired, aliphatic (and preferably cycloaliphatic) groups or segments may be preferred. Industrially available urethane polymers and copolymers include L-430. Commercially available versions of such urethane polymers and copolymers include, for example, 77-3 and -4 thermoplastic polyurethanes (experimentally available from Morton International, Inc.).

Some exemplary epoxy resins include, for example, those that contain epoxy groups and aromatic or aliphatic groups or segments. Where weatherability is desired, aliphatic (and preferably cycloaliphatic) groups or segments may be preferred. Commercially available curable epoxy resins include, for example, SCOTCHKOTE 413 fusion-bonded epoxy coating material (commercially available from 3M Company), and EPON 1001F aromatic solid epoxy resin (commercially available from Shell Chemical Co.).

Some exemplary ester polymers include, for example, those that contain repeating ester units and aromatic or aliphatic groups or segments. The ester polymer or copolymer can be a linear, non-crosslinkable material. Commercially available ester polymers and copolymers include, for example, those described in U.S. Pat. No. 6,217,252 (Tolliver)). A relatively wide variety of polyester resins can be employed, from suppliers such as Bostic Chemicals, Eastman Chemical Company, DSM Resins US, Inc., Hoechst, McWhorter Technologies, Inc., Reichhold Chemicals, Inc., Ruco Polymer Corp., and UCB Chemicals Corp.

Some exemplary commercially available polyamides and co-polyamides include, for example, Eurelon 930, 931, 940 and 961, Versamide 900 and 930 (available from Huntsman Advanced Materials Americas Inc. and BASF Corporation).

The pavement markers and compositions of the present application may include white ceramic microspheres. In some embodiments, the pavement marking compositions include up to 85 wt % white ceramic microspheres. In some embodiments, the pavement marking compositions include between about 25 weight percent and about 45 weight percent white ceramic microspheres, and more preferably between about 30 and about 42 weight percent white ceramic microspheres.

The pavement markers and compositions of the present application may include a whitening agent. Exemplary whitening agents include, for example, $TiO_2$, barium sulfate, and zinc oxide. In embodiments including $TiO_2$, the composition may include, for example, between 0.1 to about 10 weight percent $TiO_2$.

The compositions and/or pavement markings of the present application may include optical components. Exemplary optical components include, for example, transparent microspheres (i.e., beads), optical elements, and combinations thereof. The optical components may have any desired shape, with spheroidal shapes being preferred. Exemplary transparent microspheres for use in the compositions and articles of the present application include those having a refractive index between about 1.4 and about 2.6. Exemplary transparent microspheres include, for example, glass beads having a refractive index between about 1.4 to about 2.26, and transparent, solid microspheres such as those disclosed in U.S. Pat. No. 6,245,700 (Budd), U.S. Pat. No. 6,511,739 (Kasai), U.S. Pat. No. 7,524,779 (Frey), and U.S. Pat. No. 7,513,941 (Frey), incorporated by reference herein. Exemplary glass beads include those disclosed in U.S. Pat. No. 4,564,556 (Lange) and U.S. Pat. No. 4,758,469 (Lange), incorporated by reference herein. These glass beads are described generally as solid, transparent, non-vitreous, ceramic spheroids having at least one metal oxide phase.

Exemplary optical elements for use in the compositions and articles of the present application include those having a refractive index between about 1.5 and about 2.4. Exemplary optical elements include aggregates (i.e., a polymer matrix with transparent spheres and/or bonded core elements dispersed therein) and bonded core elements (i.e., materials having a core and a plurality of transparent spheres adhered to the core) such as, for example, those described in U.S. Pat. No. 5,942,280 (Mathers), U.S. Pat. No. 3,043,196 (Palmquist, et al.), U.S. Pat. No. 3,556,637 (Palmquist, et al.), and U.S. Pat. No. 3,171,827 (de Vries, et al.), incorporated by reference herein.

The pavement marking compositions described herein can form a hot melt extrusion roadway marking, a hot melt spray roadway marking, a hot melt hand-applied roadway marking, a preformed extruded roadway marking, an extruded roadway marking, a pavement marking tape, a pavement marking paint.

In some embodiments, the thermoplastic pavement marking compositions described herein can be heated to form a mixture. In some embodiments, the mixture is a homogeneous mixture.

The pavement marking composition may be applied to the transportation surface by any suitable means, including, for example, extrusion, flame-spraying, and coating on a web followed by application to a roadway. Because the pavement markings materials and compositions described herein have an increased crystallization onset temperature observed upon cooling, they crystallize more quickly during application. This can provide improvements in application and can result in decreased application costs.

In some embodiments, pavement markings are applied to a roadway using a pavement marking application device. This can be referred to as, for example, a hot-melt extrusion process, and one exemplary hot-melt extrusion process is described in U.S. Pat. No. 3,902,666 (Sakai), incorporated herein by reference. Optical components may then be added to the extruded pavement marking before the material has cooled and hardened, as described in PCT Publication No. 2007/092635 (Nagaoka), incorporated herein by reference.

In some embodiments, pavement markings are applied to a roadway using a flame-spraying process. In at least some of these embodiments, the composition can be applied using commercially-available flame-spray equipment for pavement marking applications, such as the devices described in U.S. Pat. No. 3,279,336 (Eden et al.), U.S. Pat. No. 3,393,615 (Micheln), and U.S. Pat. No. 3,874,801 (White), incorporated herein by reference.

The pavement marking composition may also be formed into a preformed marking, wherein the binder and filler are mixed, melted, pressed into a film, cooled, and later reheated and applied directly onto the transportation surface using a torch or other localized heating source, as described in U.S. Pat. No. 4,490,432 (Jordan), incorporated herein by reference.

The pavement marking composition may also be used in a pavement marking tape, wherein the binder and filler are cast as a film, as generally described in U.S. Pat. No. 4,117,192 (Jorgensen), U.S. Pat. No. 4,248,932 (Tung, et al), U.S. Pat. No. 5,643,655 (Passarino), and U.S. Pat. No. 5,563,569 (Lasch, et al), all of which are incorporated herein by reference. The top surface of the tape can have protrusions such as disclosed in U.S. Pat. No. 4,388,359 (Ethen, et al), U.S. Pat. No. 4,988,555 (Hedblom), U.S. Pat. No. 5,557,461 (Wyckoff), U.S. Pat. No. 4,969,713 (Wyckoff), U.S. Pat. No. 5,139,590 (Wyckoff), U.S. Pat. No. 5,087,148 (Wyckoff), U.S. Pat. No. 5,108,218 (Wyckoff), and U.S. Pat. No. 4,681,401 (Wyckoff), all of which are incorporated herein by reference.

The compositions of the present application can be used to form a marked transportation surface. Exemplary transportation surfaces are those made of, for example, pavement, asphalt, concrete, and bricks. Transportation surfaces to which the pavement marking materials of the present application can be applied include, for example, roadways, walkways, bicycle paths, curbs, traffic barriers, barricades, steps, parking lots, and other transportation-related horizontal, inclined or vertical surfaces. The term "pavement" will be used herein and is meant to include all possible transportation surfaces. The pavement marking on the transportation surface can have a thickness of, for example, between about 0.05 cm and about 3 cm, and preferably between 0.13 and 2 mm.

Pavement markings can be in the form of any desired indicia including, for example, stripes, text, graphics, and other symbols.

The physical properties of the compositions, materials, and articles described above are important. The following are examples of such properties.

Proper viscosity of the pavement marking composition is needed for the composition to soften and flow through the applicator at application temperatures, which typically range between about 130° C. and about 220° C. In addition, proper viscosity of the pavement marking composition results in adequate flow and leveling of the composition onto transportation surfaces. The preferred flow of the composition according to the present disclosure is equal to or less than 28% residue, as measured according to the procedure outlined in AASTHO T250-05. In some embodiments, the flow is less than 21%. In some embodiments, optical components are dropped onto the applied pavement marking composition. In these embodiments, if the viscosity of the pavement marking composition exceeds 28% residue, fixation of the optical components may be insufficient. Proper flow also allows the pavement marking composition to flow into crevices in the transportation surface and develop contact with an extensive portion of the irregular surface thereby increasing adhesion to the substrate.

Pavement markings are subject to continuous wear, exposure to the environment, and contact with road chemicals. Consequently, pavement markings preferably have high thermal stability. Thermal stability is measured herein as the temperature at which a specific percent weight loss of material occurs. Poor thermal stability contributes to degradation of the material. High thermal stability is a factor that correlates to prolonged pavement marking durability, including prolonged whiteness (i.e., due to low degradation of the material during application) and retroreflectivity. Pavement markings according to the present disclosure have a less than 1% weight loss occur at temperatures greater than about 230° C. Lower degradation during pavement marking application can also enhance material stability, (i.e., material is less likely to be removed from the transportation surface due to degradation of the pavement marking when subjected to increased temperatures).

The retroreflectivity of pavement markings provides visual guidance for drivers. This visibility is particularly important for nighttime driving. Retroreflectivity diminishes as the pavement marking surface erodes (e.g., the microspheres become dislodged or are damaged). Pavement markings according to the present disclosure exhibit good retroreflectivity and retain this retroreflectivity during usage.

Improved contrast between pavement markings and transportation surfaces results in increased visibility. Preferably, pavement markings according to the present disclosure have a whiteness greater than about 60 after 4 hours of heating at 230° F. (110° C.), when measured according to ASTM E-313-10.

Pavement markings undergo strenuous wear. Many of the pavement markings, such as stop bars or cross-walk markings, extend across the path of travel and are traversed by every vehicle traveling along the controlled lane of travel. Also, at an intersection, vehicles are often in a stop, start, or turning mode, and these modes increase the wear action on the markings. In many geographic areas, sand and chemical treatments are frequently applied at intersections to reduce slippery conditions, and those treatments further aggravate wear conditions. Consequently, there is a need for pavement markings with increased abrasion resistance. The pavement markings and materials of the present patent application exhibit good mechanical stability, even when exposed to large temperature swings, such as, for example, temperatures between −29° C. and 71° C.

Advantages and embodiments of this disclosure are further illustrated by the following examples, but the particular materials and amounts thereof recited in these examples, as well as other conditions and details, should not be construed to unduly limit this disclosure. In these examples, all percentages, proportions and ratios are by weight unless otherwise indicated.

EXAMPLES

Test Methods
Weight Loss
Thermogravimetric Analysis (TGA) was conducted using a Thermogravimetric Analyzer (Model Q5000IR, obtained from TA Instruments, New Castle, Del.). The TGA specimens were prepared by loading approximately 4-7 mg of material into previously tared sample pans. The samples were analyzed using the TA Hi-Res™ mode on the Thermogravimetric Analyzer, with a linear heating rate of 20° C./min, and a resolution setting of 5.0. The samples were analyzed between room temperature and 550° C. in an air atmosphere. Weight loss is expressed at the temperature in which 1 wt % or 5 wt % loss was measured.

Flow
Flow testing was conducted by heating 400 g of pavement marking composition in a weighed container using a vented oven (THELCO Laboratory Oven Model 6557 (available from Thermo Scientific, St. Waltham, Mass.) set at 220° C. The container was placed in the oven for between about 3 to 4 hours and was subsequently removed from the oven. Molten material was thoroughly mixed by hand using a steel spatula. The temperature of the molten material was measured using an infra-red thermometer and allowed to cool to approximately 204.4° C. Immediately after, the material was poured at a 45 degree angle using a container holder, as described in AASHTO T250-05 (2009) "Standard Method of Test for Thermoplastic Traffic Line Material." The contents were allowed to drain until flow stopped, and the container plus residual material were weighed. The percent residue was calculated and recorded. Flow is reported as the percent residue remaining in the container.

Youngs Modulus
Youngs Modulus testing was performed on an Instron Model 1122 tensile testing machine with MTS Renew upgrade package. An Instron 2511-301 1000 lb reversible load cell, self aligning mechanical grips and MTS Testworks 4 software were used. Type III specimens were tested per ASTM D638 at 0.2 in/min under standard conditions (25° C. and 50% relative humidity) except that results are reported as an average of at least two specimens.

Durometer Hardness ASTM D2240 (Standard Property for Rubber Property—Durometer Hardness)

Durometer hardness was tested using a Rex Gauge model 1600 Durometer tester with weight (total weight approximately 1000 grams) and Techne 12 liter water temperature bath and recirculating temperature controller Model FTE10APC available from Paul N Gardner Company Incorporated. Test specimens were made by pouring 218° C. (425° F.) homogeneously mixed heated thermoplastic into a 20 ml aluminum pan to approximately ½ inch thickness, and then allowing the mixture to cool to room temperature. The heater on water bath was set to 46° C.±1.0° C. (115° F.±3.0° F.) and allowed to stabilize. The oven was set to 46° C.±1.0° C. (115°

F.±3.0° F.) with the type A Durometer placed inside and allowed to stabilize. The cooled test samples were placed in the oscillating water bath. Once all test samples and testing equipment had stabilized at the set temperature the samples were tested. The hardness tester was removed from the oven and quickly placed in the water bath making sure that the needle point and bottom of weight were below the waterline. Then, the hardness tester was placed over the samples keeping both under water at all times. Then, the hardness tester was lowered onto the center of the specimen and timing intervals of 15 seconds began. After 15 seconds, the A value was recorded. Three readings were made in different places on each test specimen and the average reading was reported.

Whiteness Index

Whiteness index was measured using a colorimeter (model COLORFLEX obtained from Hunter Associates Laboratory, Reston, Va.) using a D65 illuminant and 2 degree observer, following the procedure outlined in ASTM E313-10, "Standard Practice for Calculating Yellowness and Whiteness Indices from Instrumentally Measured Color differences."

Dirt Resistance

Dirt resistance was measured according to the following procedure: a pavement marking composition was poured onto a non-stick surface and allowed to cool down to ambient temperature. A clean, smooth, flat, 2.5 inch (6.25 cm) diameter test sample of the pavement marking was selected. Whiteness of the test sample was measured as described above. The test samples were subsequently conditioned in an oven set at 120° F. (48.9° C.) (model V-29, obtained from Despatch Industries, Lakeville, Minn.) for 1 hour. The test samples were removed from the oven and placed in a horizontal position and covered with a layer of standard carpet soil, (product identification number 98-0211-3493-1, available from Gorecki Manufacturing Company, Milaca, Minn.) having a thickness from about 0.0625 in (0.16 cm) to about 0.125 in (0.32 cm). A 1750 gram cylindrical weight was placed on top of the soil. After 30 minutes, the weight was removed from the test sample. The soil was then removed from the test sample by holding the specimen at 90 degrees and tapping it gently on the bench top to dislodge loosely held dirt. Remaining loose soil was removed with a soft, dry brush. Final whiteness was measured as described above and compared to the whiteness index for comparison.

Glass Transition Temperature

The glass transition temperature (Tg) was measured using a differential scanning calorimeter, in particular, a Modulated™ DSC ("MDSC™") (model "Q2000" obtained from TA Instruments). Test samples were prepared by weighing and loading the material into aluminum sample pans. The sample were analyzed from about −80° C. to about 190° C. using a ramp of 5° C./minute and a perturbation amplitude setting of ±0.796° C. every 60 seconds. The Tg is expressed in degrees Celsius (° C.). The half height temperature of the Tg step was determined and expressed in degrees Celsius (° C.).

Melting Temperature

The melting peak temperature (Tm) was measured using the "MDSC," as described above, and is expressed in degrees Celsius (° C.).

Crystallization Temperature

The crystallization onset temperature (Tc) was measured using the "MDSC," as described above, and is expressed in degrees Celsius (° C.).

Materials

The following materials were used in the preparation of Comparative Examples A-B and Examples 1-5:

| TRADE DESIGNATION | DESCRIPTION | SUPPLIER |
|---|---|---|
| "AC 5120" | Ethylene Acrylic Acid Copolymer (EAA) Mn = 1005 g/mol, 15 weight percent acrylic acid | Honeywell International Inc., Morristown, NJ |
| "PRIMACOR 59901" | Ethylene Acrylic Acid Copolymer (EAA) Mn = 8.4 × 10$^3$ g/mol, 20 weight percent acrylic acid | The Dow Chemical Company, Midland, MI |
| "SYLVACOTE 4973" | Maleic modified ester of rosin | Arizona Chemical, Jacksonville, FL |
| "SYLVATAC RE100" | Pentaerythritol ester of rosin | Arizona Chemical, Jacksonville, FL |
| "EPOLENE C-16" | Low density polyethylene | Westlake Center, Houston, TX |
| "EASTMAN 168 PLASTICIZER" | Bis(2-ethylhexyl) terephthalate | Eastman Chemical Company, Kingsport, TN |
| "OMYACARB 5" | Calcium carbonate | Omya, Valley, CA |
| "W-410 WHITE ZEOSPHERES" | White ceramic microspheres | 3M Company, St. Paul, MN |
| "PTFE J-24" | Polytetrafluoroethylene | 3M Company |
| "R-900" | Titanium dioxide | Du Pont Titanium Technologies, Wilmington, DE |
| "MEGA-LUX TYPE 3 GLASS SPHERES" | Glass spheres having a refractive index (RI) of 1.5 and average diameter between 1.0 mm and 1.18 mm. | Swarco Industries, Columbia, TN |
| "MEGA-LUX TYPE 1 GLASS SPHERES" | Glass spheres having a RI of 1.5 and average diameter between 0.3 mm and 0.6 mm. | Swarco Industries, Columbia, TN |

Comparative Examples A-B

Pavement markings of Comparative Examples A-D were prepared using compositions shown in Table 1, below, and expressed in wt % based on the total weight of the composition. All components were added to a round container which was then placed in the vented oven set at 220° C. (428° F.) for about one hour. The container was removed from the oven and the components immediately. The container was subsequently placed back in the oven and mixed once every one hour. After three hours, the container was removed from the oven and the components were mixed by hand using a steel spatula for about 2-3 minutes.

TABLE 1

Composition of Comparative Examples A and B

| Components | Comp. Ex. A (wt %) | Comp. Ex. B (wt %) |
|---|---|---|
| "SYLVACOTE 4973" | 15 | 0 |
| "SYLVATAC RE 100" | 4.50 | 0 |
| "EPOLENE C-16" | 1.50 | 0 |
| "EASTMAN 168 PLASTICIZER" | 1.00 | 0 |
| "AC 5120" | 0 | 20.00 |
| "OMYACARB 5" | 28.00 | 30.00 |
| "TiO$_2$ R-900" | 10.00 | 10.00 |
| MEGA-LUX TYPE 3 GLASS SPHERES | 20.00 | 20.00 |
| "MEGA-LUX GLASS SPHERES" | 20.00 | 20.00 |

Examples 1-5

Examples 1-5 were prepared as described in Comparative Examples A-B, except that a blend of EAA resins was used. Composition of Examples 1-5 is shown in Table 2, below.

TABLE 2

Composition of Examples 1-5

| Components | Ex. 1 (wt %) | Ex. 2 (wt %) | Ex. 3 (wt %) | Ex. 4 (wt %) | Ex. 5 (wt %) |
|---|---|---|---|---|---|
| "AC 5120" | 15.00 | 18.75 | 18.75 | 18.75 | 18.75 |
| "PRIMACOR 5990I" | 5.00 | 6.25 | 6.25 | 6.25 | 6.25 |
| "OMYACARB 5" | 30.00 | 25.00 | 0 | 15.00 | 0 |
| "W-410 WHITE" | 0 | 0 | 25.00 | 0 | 18.0 |
| "PTFE J-24" | 0 | 0 | 0 | 10.00 | 7.0 |
| "TiO$_2$ R-900" | 10.00 | 10.00 | 10.00 | 10.00 | 10.00 |
| MEGA-LUX TYPE 3 GLASS SPHERES | 20.00 | 20.00 | 20.00 | 20.00 | 20.00 |
| "MEGA-LUX GLASS SPHERES" | 20.00 | 20.00 | 20.00 | 20.00 | 20.00 |

The glass transition temperature (Tg), crystallization onset temperature (Tc), and melting temperature (Tm) were measured for Comparative Examples A-B and Examples 1-5, as described above. Results are reported in Table 3, below.

TABLE 3

Glass Transition Temperature (Tg), Crystallization Onset Temperature (Tc), and Melting Temperature (Tm) Results

| Examples | Tg (° C.) | Tc Onset (° C.) | Tm (° C.) |
|---|---|---|---|
| Comparative Example A | 47.3 | 195.9 | 89 |
| Comparative Example B | −2.8 | 85.5 | 83.2 |
| Example 1 | 5.7 | 85.6 | 83.3 |
| Example 2 | −6.9 | 83.3 | 82.3 |
| Example 3 | 8.4 | 84.1 | 82.5 |
| Example 4 | 4.7 | 89.3 | 78.2 |
| Example 5 | 4.1 | 88.4 | 77.9 |

Whiteness index, temperature at which differing percentages of weight loss occurred, flow, Durometer hardness, and Young's Modulus were measured for Comparative Examples A-B and Examples 1-5. The results are reported in Table 4, below.

TABLE 4

Whiteness, Weight Loss, Flow, Elastic Modulus, and Hardness Results

| Examples | Whiteness Index | 1% wt loss Temp. (° C.) | 5% wt loss Temp. (° C.) | Flow (Percent Residual) | Durometer Hardness | Youngs Modulus (Megapascals) |
|---|---|---|---|---|---|---|
| Comp. Ex. A | 35.9 | 229.9 | 305.2 | 11 | 94 | 451.6 |
| Comp. Ex. B | 79.6 | 307.3 | 429.5 | 11 | 47 | 298.9 |
| Example 1 | 81.0 | 283.7 | 395.1 | 45 | 71 | 421.3 |
| Example 2 | 80.4 | 272.9 | 356.7 | 20 | 69 | 283.4 |
| Example 3 | 83.4 | 305.9 | 424.5 | 13 | 62 | 179.6 |
| Example 4 | 81.6 | 283.1 | 366.1 | 17 | 62 | 194.4 |
| Example 5 | 80.1 | 278.3 | 380.3 | 21 | 57 | 180.6 |

Dirt resistance was measured as described above. Results are expressed as final whiteness index in Table 5 below.

TABLE 5

Whiteness Index Results

| Examples | Initial Whiteness Index | Final Whiteness Index |
|---|---|---|
| Comparative Example A | 35.9 | 34.64 |
| Comparative Example B | 79.6 | 50.85 |
| Example 1 | 81.0 | 51.22 |
| Example 2 | 80.4 | 60.99 |
| Example 3 | 83.4 | 62.62 |
| Example 4 | 81.6 | 45.39 |
| Example 5 | 80.1 | 43.81 |

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A thermoplastic pavement marking composition, comprising:
   a miscible blend of ethylene acrylic acid polymers including
   a first ethylene acrylic acid polymer having a number average molecular weight between about 1.0×10$^4$ grams per mole and about 1.0×10$^5$ grams per mole; and a second ethylene acrylic acid polymer having a number average molecular weight between about 1500 grams per mole and about 5000 grams per mole;

wherein the crystallization onset temperature observed upon cooling of the thermoplastic pavement marking composition is greater than 65.6° C. (150° F.).

2. The thermoplastic pavement marking composition of claim 1, further including white ceramic microspheres.

3. The thermoplastic pavement marking composition of claim 1, further including up to about 85 weight percent white ceramic microspheres
wherein the weight percent is of the entire thermoplastic pavement marking composition.

4. The thermoplastic pavement marking composition of claim 1, including between about 1.5 wt % and about 55 wt % weight percent first ethylene acrylic acid polymer
wherein the weight percent is of the entire thermoplastic pavement marking composition.

5. The thermoplastic pavement marking composition of claim 1, including between about 5 wt % and about 72 wt % second ethylene acrylic acid polymer
wherein the weight percent is of the entire thermoplastic pavement marking composition.

6. The thermoplastic pavement marking composition of claim 1, further including 0.1 to 10 weight percent $TiO_2$
wherein the weight percent is of the entire thermoplastic pavement marking composition.

7. The thermoplastic pavement marking composition of claim 1, further comprising optical components.

8. The thermoplastic pavement marking composition of claim 1, wherein the first ethylene acrylic acid polymer has an acid content between about 3% and about 20%.

9. The thermoplastic pavement marking composition of claim 1, wherein the second ethylene acrylic acid polymer has an acid content between about 5% and about 15%.

10. The thermoplastic pavement marking composition of claim 1, further including acrylic polymers and copolymers, olefin polymers and copolymers, olefin block copolymers, thermoplastic urethane polymers and copolymers, ester polymers and copolymers, polyamide polymers and copolymers, and blends thereof.

11. The thermoplastic pavement marking composition of claim 1 having a flow according to AASHTO T-250-5 of less than 28 percent residue.

12. The thermoplastic pavement marking composition of claim 1 having a temperature at which 1% weight loss occurs as measured by thermogravimetric analysis of greater than 230° C.

13. The thermoplastic pavement marking composition of claim 1 having a whiteness index as measured by ASTM E313 of greater than 60 after 4 hours of heating at 425 degrees F.

14. A thermoplastic pavement marking composition, comprising:
a miscible blend of ethylene acrylic acid polymers including
a first ethylene acrylic acid polymer having an acid content between about 3% and about 20% and having a number average molecular weight between about $1.0 \times 10^4$ grams per mole and about $1.0 \times 10^5$ grams per mole
a second ethylene acrylic acid polymer having an acid content between about 5% and about 15%
wherein the crystallization onset temperature observed upon cooling of the thermoplastic pavement marking composition is greater than 65.6° C. (150° F.).

15. The thermoplastic pavement marking composition of claim 14, further including white ceramic microspheres.

16. The thermoplastic pavement marking composition of claim 14, further including up to 85 wt % white ceramic microspheres wherein the weight percent is of the entire thermoplastic pavement marking composition.

17. The thermoplastic pavement marking composition of claim 14, including between about 1.5 wt % and about 55 wt % first ethylene acrylic acid polymer wherein the weight percent is of the entire thermoplastic pavement marking composition.

18. The thermoplastic pavement marking composition of claim 14, including between about 5 wt % and about 72 wt % second ethylene acrylic acid polymer wherein the weight percent is of the entire thermoplastic pavement marking composition.

19. The thermoplastic pavement marking composition of claim 14, further including 0.1 to 10 weight percent $TiO_2$ wherein the weight percent is of the entire thermoplastic pavement marking composition.

20. The thermoplastic pavement marking composition of claim 14, further comprising optical components.

21. The thermoplastic pavement marking composition of claim 14, wherein the second ethylene acrylic acid polymer has a number average molecular weight between about 1500 grams per mole and about 5000 grams per mole.

22. The thermoplastic pavement marking composition of claim 14 in the form of a hot melt extrusion roadway marking, a hot melt spray roadway marking, a hot melt hand-applied roadway marking, a preformed extruded roadway marking, an extruded roadway marking, a pavement marking tape, a pavement marking paint.

23. The thermoplastic pavement marking composition of claim 14 having a flow according to AASHTO T-250-5 of less than 28 percent residue.

24. The thermoplastic pavement marking composition of claim 14 having a temperature at which 1% weight loss occurs as measured by thermogravimetric analysis of greater than 230° C.

25. The thermoplastic pavement marking composition of claim 14 having a whiteness index as measured by ASTM E313 of greater than 60 after 4 hours of heating at 425 degrees F.

26. The thermoplastic pavement marking composition of claim 14, further including acrylic polymers and copolymers, olefin polymers and copolymers, olefin block copolymers, thermoplastic urethane polymers and copolymers, ester polymers and copolymers, polyamide polymers and copolymers, and blends thereof.

27. A method of forming a pavement marking, comprising:
heating the thermoplastic pavement marking of claim 1; and
applying the resulting homogenous mixture to a roadway.

28. The method of claim 27, further comprising:
applying optical components to the roadway.

* * * * *